(12) United States Patent
Travis

(10) Patent No.: US 8,085,364 B2
(45) Date of Patent: Dec. 27, 2011

(54) DISPLAY WITH FOCUSSED ILLUMINATION

(75) Inventor: Adrian Robert Leigh Travis, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 691 days.

(21) Appl. No.: 12/047,073

(22) Filed: Mar. 12, 2008

(65) Prior Publication Data
US 2008/0225205 A1     Sep. 18, 2008

(51) Int. Cl.
*G02F 1/1335* (2006.01)
(52) U.S. Cl. .................. 349/95; 349/65; 362/97.2
(58) Field of Classification Search ............. 349/65, 349/106, 95, 57, 113, 114, 62, 68; 362/612, 362/609, 97.2, 339, 97.1
See application file for complete search history.

(56) References Cited

U.S. PATENT DOCUMENTS

| | | | | |
|---|---|---|---|---|
| 5,919,551 A * | 7/1999 | Cobb et al. | ..................... | 428/156 |
| 6,667,819 B2 * | 12/2003 | Nishikawa et al. | ............. | 359/15 |
| 6,788,467 B2 * | 9/2004 | Miyamae et al. | ............. | 359/619 |
| 6,791,639 B2 * | 9/2004 | Colgan et al. | ................... | 349/95 |
| 7,742,123 B2 * | 6/2010 | Jung | ............................... | 349/62 |
| 7,746,517 B2 * | 6/2010 | Miller et al. | .................. | 358/474 |
| 2002/0093743 A1 | 7/2002 | Miyamae et al. | | |

FOREIGN PATENT DOCUMENTS

| EP | 1211551 A2 | 11/2001 |
|---|---|---|
| WO | WO9726584 | 7/1997 |
| WO | WO2004074917 | 2/2004 |

* cited by examiner

*Primary Examiner* — Thoi Duong
(74) *Attorney, Agent, or Firm* — Lee & Hayes, PLLC

(57) ABSTRACT

A liquid crystal display with focused illumination is described. In an example, a light-source emitting a plurality of discrete colors is focused onto a liquid crystal display panel. The liquid crystal display panel has a plurality of pixels and each pixel has regions corresponding to the colors emitted by the light-source. Light of each color is focused onto the regions of the pixels corresponding to that color.

15 Claims, 9 Drawing Sheets

DISPLAY WITH FOCUSSED ILLUMINATION

CROSS-REFERENCE TO RELATED APPLICATION

This patent application claims priority from UK Patent Application number 0704803.6 filed 13 Mar. 2007.

BACKGROUND

Color video images can be displayed on cathode ray tubes with three electron guns, one for each color, and a shadow mask which ensures that electrons from each gun hit only phosphor dots whose color primary matches that intended. The three electron beams are scanned simultaneously. The color primaries in video cameras are also recorded simultaneously so that the camera matches the display.

The simultaneous recording of color primaries at each pixel is now the standard which other display technologies must utilize to retain compatibility with existing infrastructure. An efficient way to get color on a liquid crystal display would be to illuminate it with red, then green, then blue light in turn, but this departs from the convention of simultaneous color primaries. The result is that as an eye follows a moving image, the eye sees the image separate spatially into three parts, each comprising one of the color primaries.

Color separation is avoided by illuminating liquid crystal panels with white light and providing a color filter, one for each primary, over three liquid crystal cells which combine to form a pixel. The color filters are expensive and they waste two thirds of the illumination.

Light emitting diodes have recently become sufficiently bright to illuminate liquid crystal panels economically, but many light emitting diodes must be spaced evenly behind the display if illumination is to be sufficiently uniform. Costs diminish with component count and a few bright light emitting diodes suffice if placed at the end of an acrylic wedge-shaped light-guide which evenly distributes the light across the liquid crystal panel. However, the losses of acrylic are such as to eliminate the advantage otherwise gained by this approach.

The embodiments described below are not limited to implementations which solve any or all of the disadvantages of known systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A liquid crystal display with focused illumination is described. In an example, a light-source emitting a plurality of discrete colors is focused onto a liquid crystal display panel. The liquid crystal display panel has a plurality of pixels and each pixel has regions corresponding to the colors emitted by the light-source. Light of each color is focused onto the regions of the pixels corresponding to that color.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
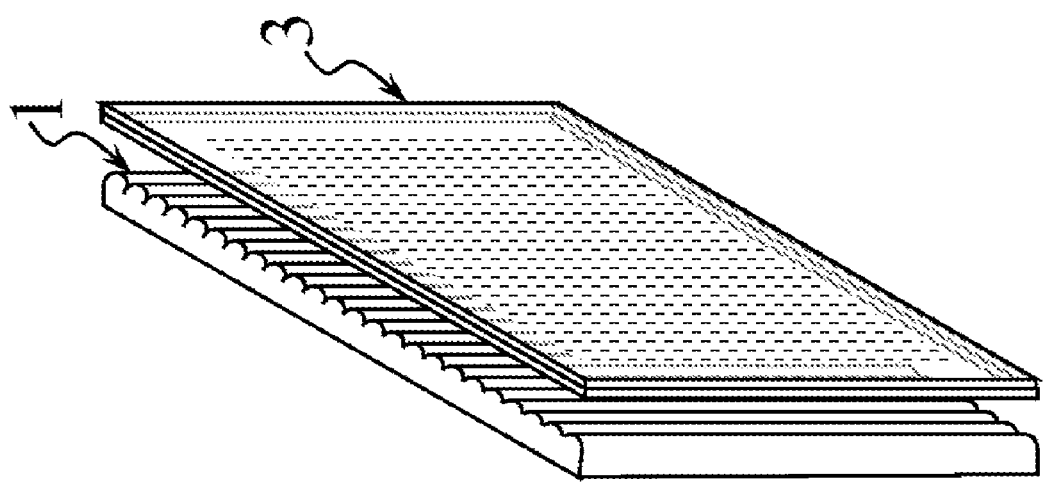
FIG. 1 is a schematic drawing of a liquid crystal panel and backlight where each column of the liquid crystal panel is illuminated by red, green or blue light.
Figure 1:
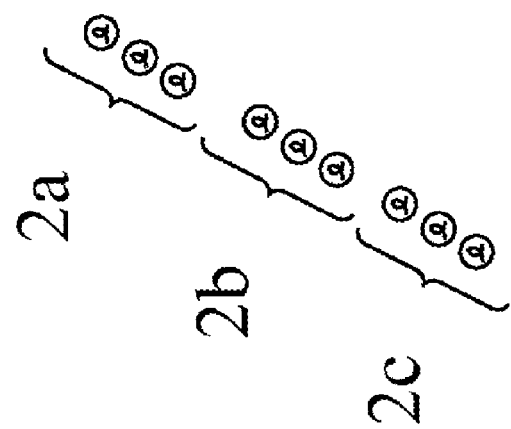

In FIG. 1, a lenslet array 1 is located between a set of Light Emitting Diodes (LEDs) 2a, 2b and 2c and a liquid crystal panel 3. The liquid crystal panel comprises an array of pixels of which the attenuation can be controlled. The panel is constructed in the conventional manner, and may utilize any established modes of construction of liquid crystal panels, as commonly utilized in liquid crystal displays.

The LEDs are arranged into three groups, one group 2a emitting red light, a second group 2b emitting green light, and the third group 2c emitting blue light. In FIG. 1 three LEDs are shown of each color, but other numbers are also applicable and if sufficient optical power and uniform illumination can be achieved from a single diode then only one diode of each color need be utilized. The LEDs 2 are sufficiently far from the liquid crystal panel 3 that, in the absence of the lenslet array 1, the liquid crystal panel 3 would be uniformly illuminated. However, the lenslet array 1 is included in such a way that each lenslet forms an image of the LEDs 2a, 2b, 2c in the plane of the liquid crystal layer of the liquid crystal panel, and the pitch of the lenslets is such that three columns of the liquid crystal panel 3 are illuminated by each lenslet. The spacing of the light emitting diode groups 2a, 2b, 2c is such that each lenslet illuminates one of its columns with light from group 2a, one with light from group 2b and one with light from group 2c.

Figure 2:
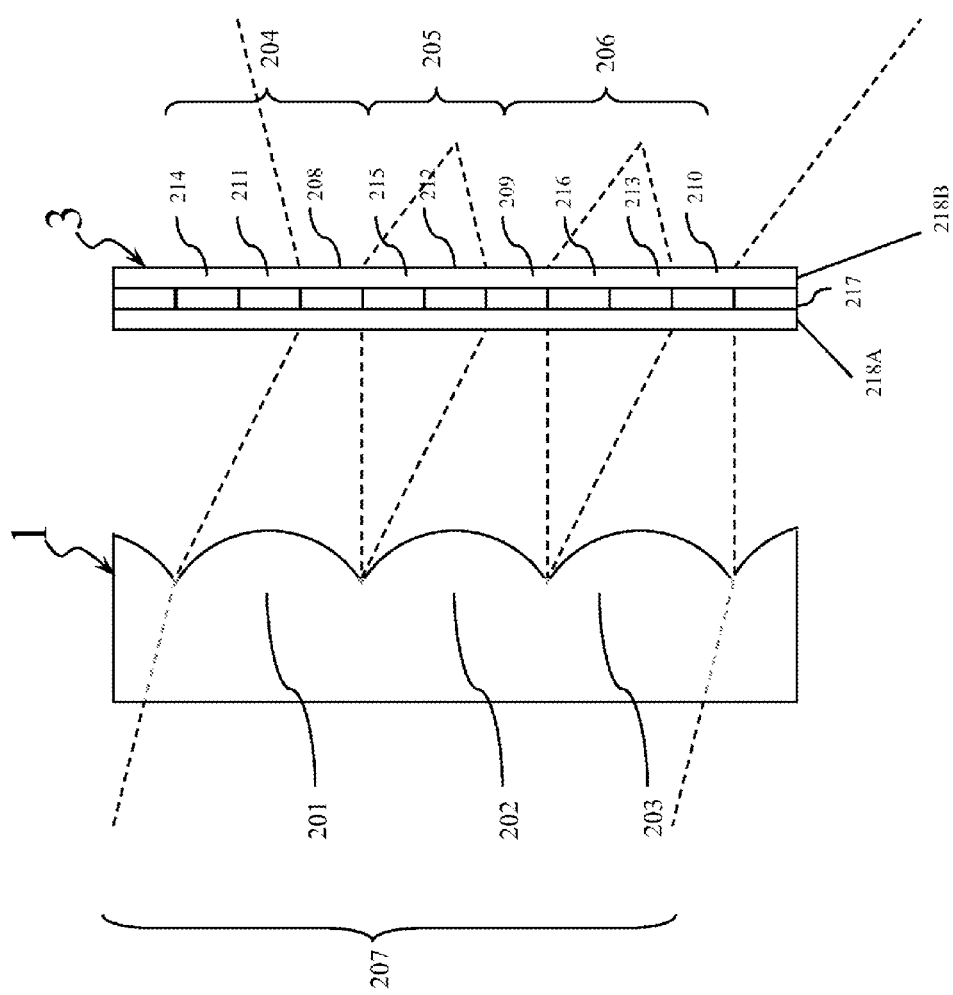
FIG. 2 is a ray diagram of a small cross-section of FIG. 1.

FIG. 2 shows three lenslets, 201, 202 and 203 and three groups of three liquid crystal panel columns 204, 205, 206, each group corresponding to a lenslet. Incoming light 207 from the first set 2a of the LEDs 2a, 2b, 2c (not shown in FIG. 2) is focused by a lenslet onto the first column of the group corresponding to that lenslet as shown by the broken lines. Thus, lenslet 201 focuses light from set 2a of the LEDs onto column 208.

Light from the second set 2b of LEDs is focused by a lenslet onto the second column of the group corresponding to that lenslet and light from the third set 2c of LEDs is focused onto the third column 214, 215, 216.

In order to increase the viewing angle of the display, means to diffuse the light in an axis perpendicular to the focusing effect of the lenslets may be provided. For example, a set of parallel but randomly spaced ridges may be embossed on the flat side of the lenslet array 1, the axis of the ridges being perpendicular to that of the lenslets. Alternatively, the lenslet array could be a two-dimensional array of spherical lenslets, such that in addition to the focusing described above, the light is also focused in the perpendicular axis to provide an increased viewing angle.

The pixels of a liquid crystal panel may be as small as 90 microns while the glass 218A and 218B on either side of the liquid crystal layer 217 may be as thick as 1000 microns. With these dimensions the maximum angle in radians at which rays can converge from one lenslet is approximately equal to the ratio 0.09, equivalent to 6°. The field of view is limited to an angle of similar magnitude, but significantly larger fields of view may be desirable.

Figure 3:
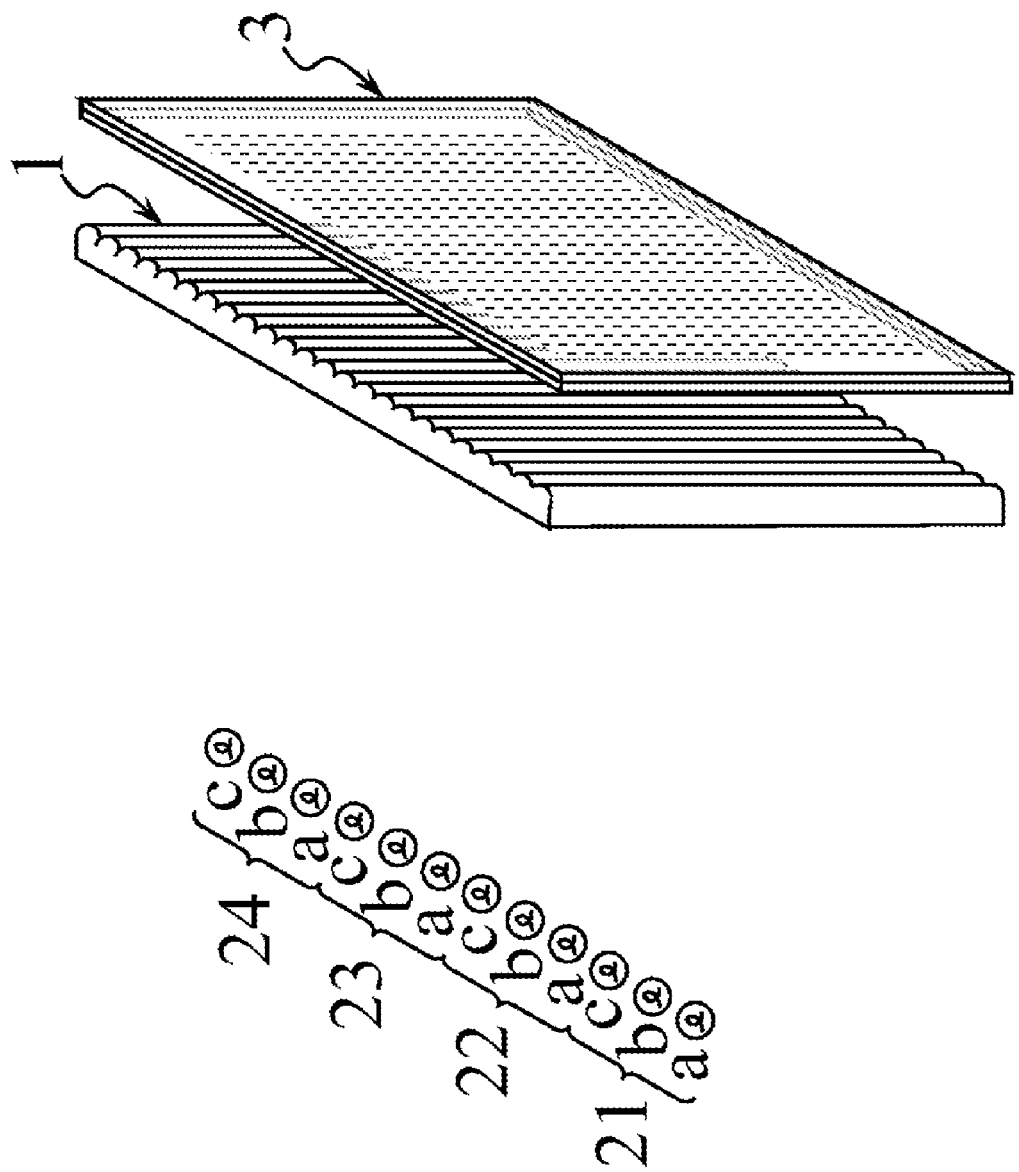
FIG. 3 is a schematic drawing of a display using groups of light emitting diodes.
Figure 4:
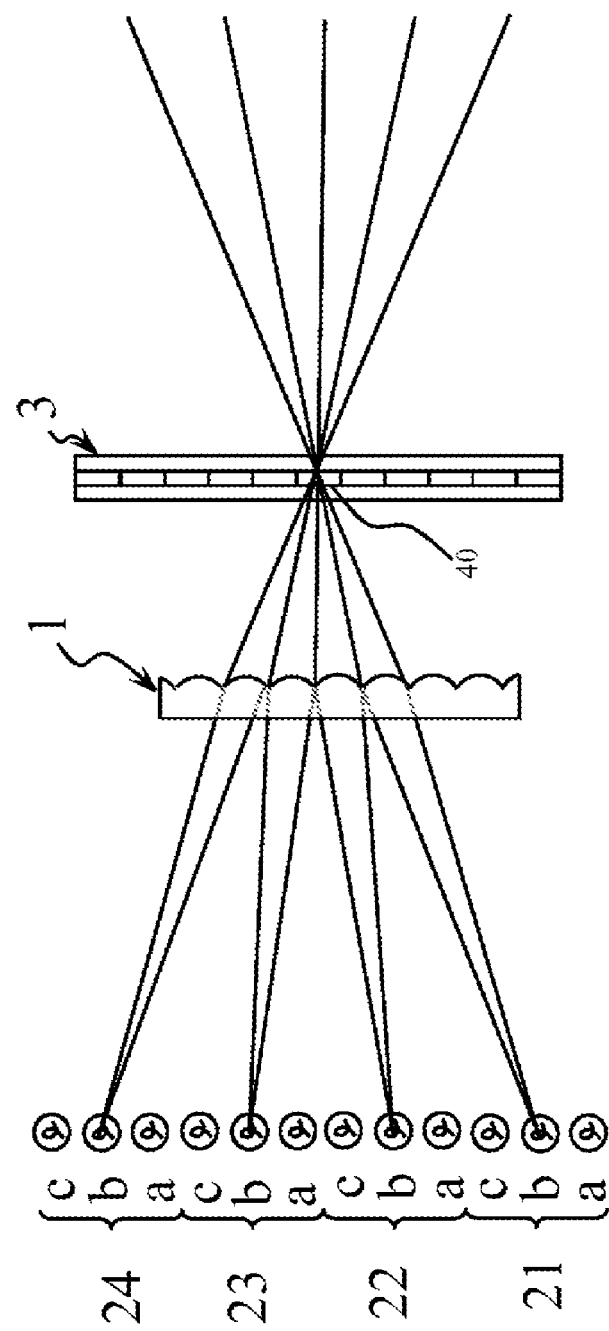
FIG. 4 is a ray diagram of a small cross-section of FIG. 3 and shows how rays of one color will illuminate a pixel over a wide range of angles.

FIG. 3 shows an example display which utilizes repeated groups 21, 22, 23, 24 of red, green and blue a, b, c LEDs to increase the field of view. FIG. 4 shows a ray diagram of light emitted by the 'b' LEDs, highlighting that the light from each of the like-colored LEDs 21b, 22b, 23b, 24b is focused onto one column 40. The number of LEDs need not be the same for each color, and furthermore the distribution may vary across the display. Due to the increased angular spread of the LEDs 21, 22, 23, 24 compared to those of one group in FIG. 1, the viewing angle is increased compared to the example of FIG. 1.

Figure 5:
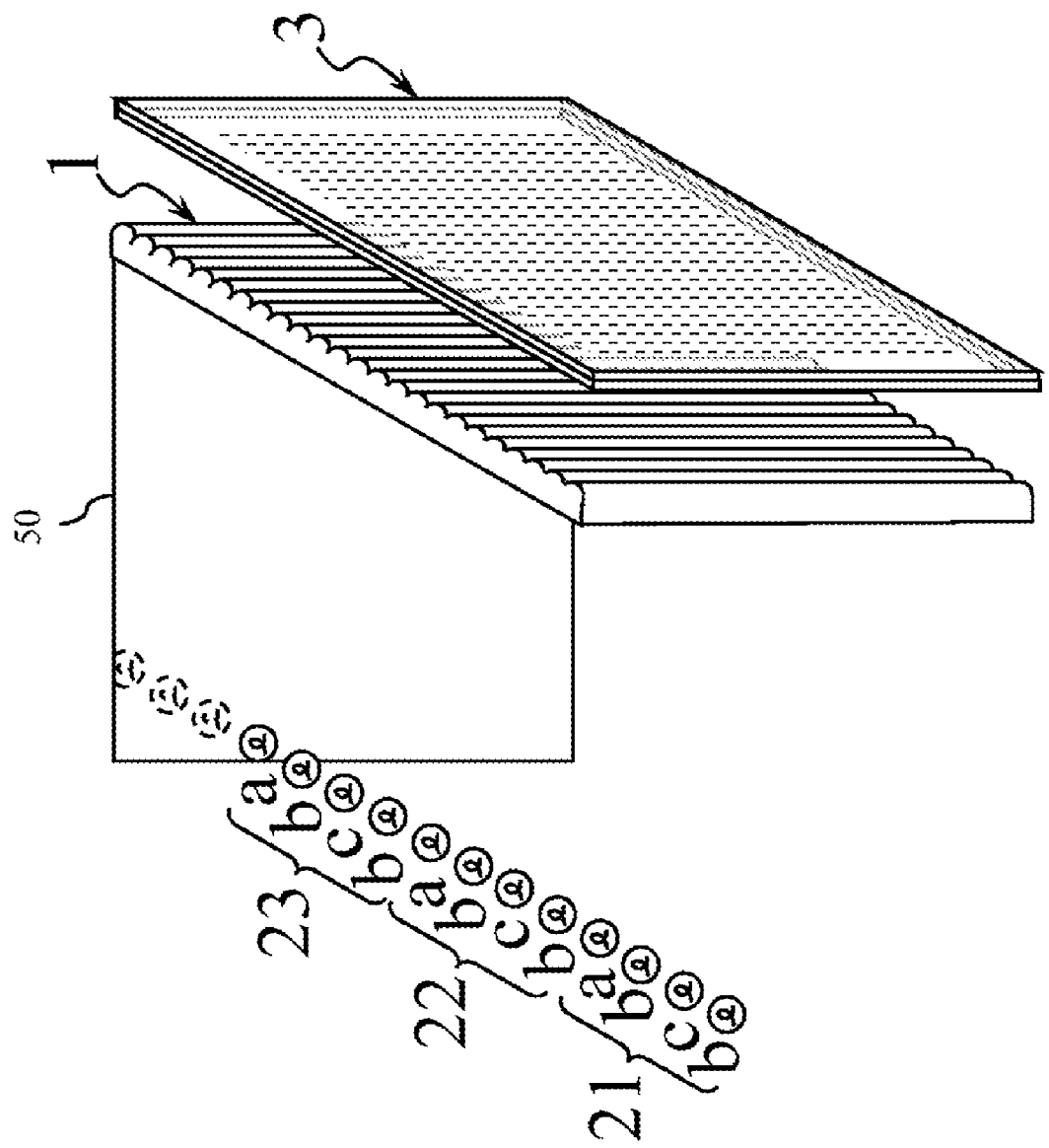
FIG. 5 shows how a mirror can be used to ensure that pixels at the edge of the liquid crystal panel are also illuminated over a wide range of angles.
Figure 6:
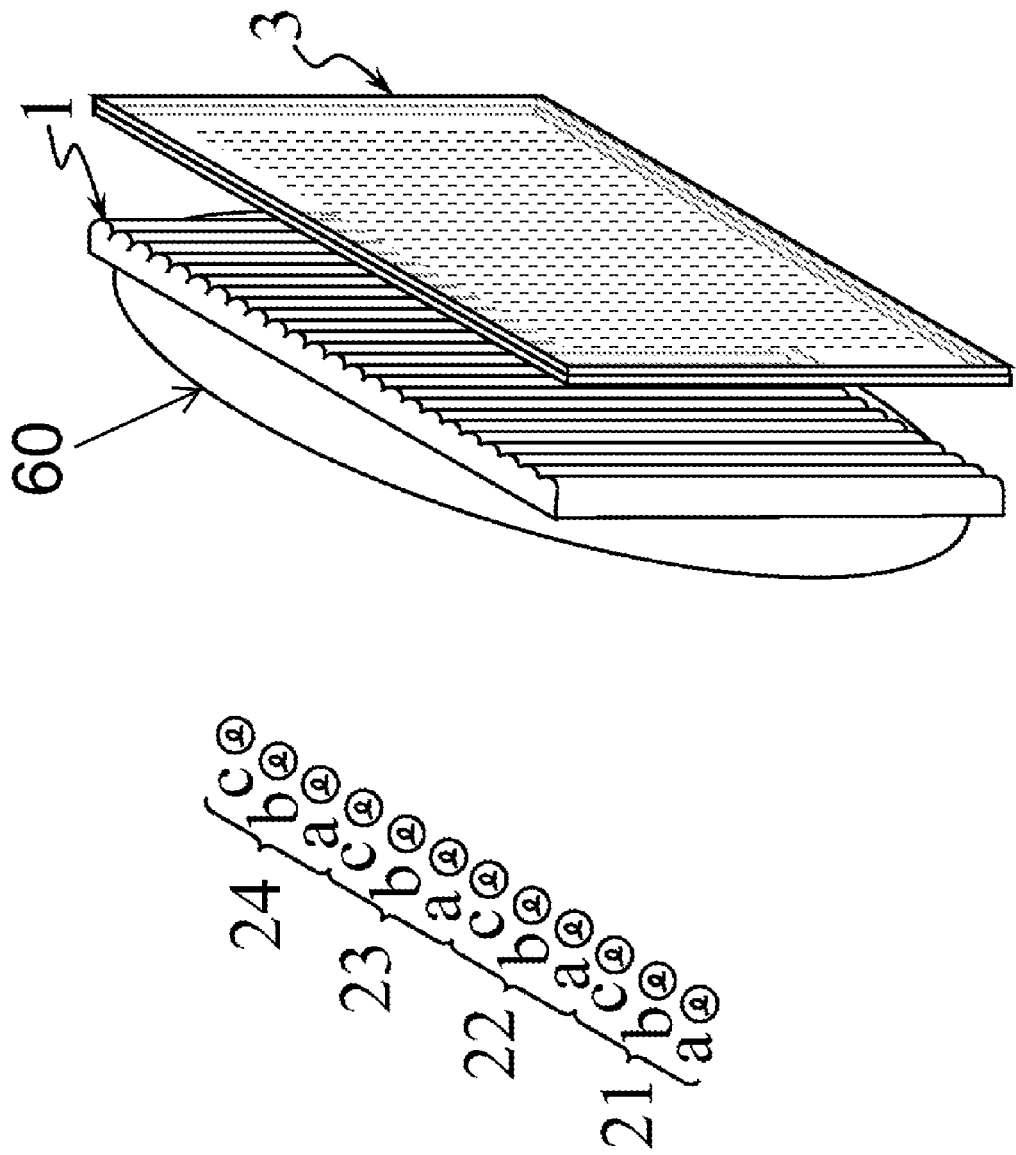
FIG. 6 shows how a lens can be used to ensure that pixels at the edge of the liquid crystal panel are illuminated over a wide range of angles.

Unless the LEDs are arranged over an area considerably greater than the area of the Liquid Crystal Panel, pixels at the sides of the panel will only be illuminated from a single direction. FIG. 5 shows a display in which a mirror 50 is located at a side of the area between the LEDs and the liquid crystal panel such that pixels at the edge of the panel are illuminated from both sides. A further mirror (not shown) may also be located at the opposite side of the display. When mirrors are utilized a symmetric pattern of illumination is typically utilized. For example, red-green-blue-green instead of the conventional red-green-blue pattern. However, a symmetrical pattern may be less compact that a non-symmetrical arrangement. FIG. 6 shows an alternative configuration which utilizes a lens 60 between the LEDs and the liquid crystal panel. The LEDs are positioned in the focal plane of the lens and thus all of the area of the liquid crystal panel is illuminated over the same range of angles. The lens may be constructed using any suitable form of lens, for example a flat-panel lens.

In order to provide uniform illumination of the liquid crystal panel in the displays of FIGS. 1 to 6, the LEDs are usually spaced from the liquid crystal panel, which limits the minimum thickness of the display. The thickness can be reduced by utilizing an array of the lights of FIG. 1 to cover the whole panel, but the increased number of components and increased complexity may increase the cost of the display.

Figure 7:
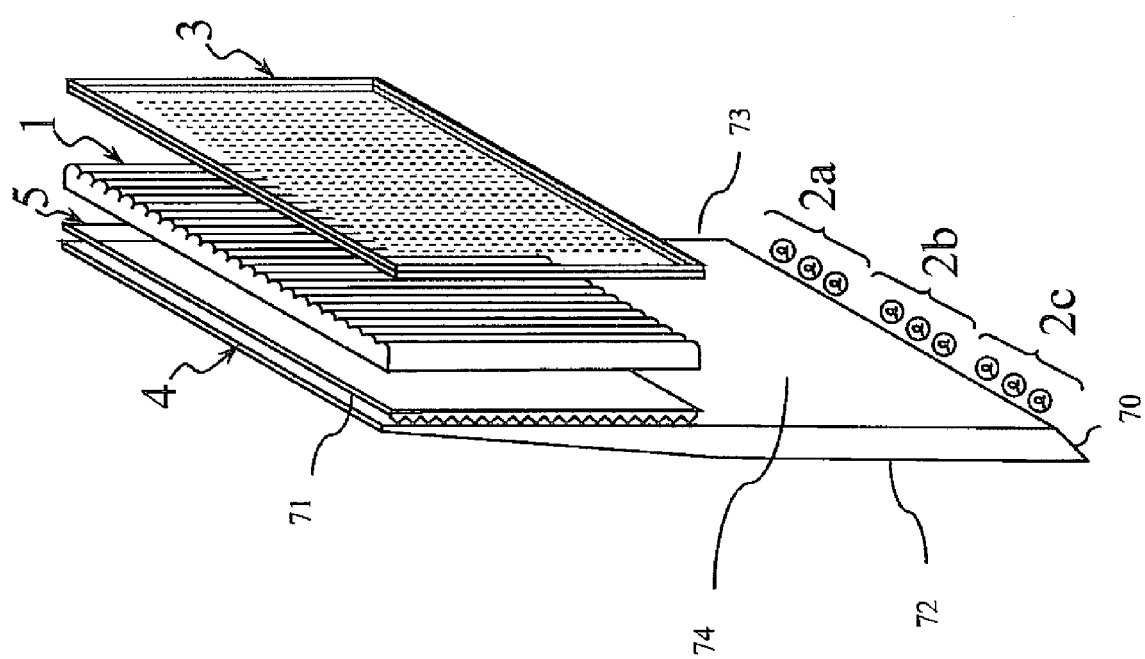
FIG. 7 shows how the set-up of FIG. 1 can be made thinner by placing a light guide and turning film between the light source and the lenslet array.

FIG. 7 shows an example of a display having a reduced thickness. Lenslet array 1, liquid crystal panel 3 and LEDs 2a, 2b, 2c are as described previously. A wedge-shaped light-guide 4 is positioned to guide light from the LEDs to the lenslet array. The light-guide utilizes total internal reflection to guide light from the thick-end 70 of the wedge, into which light is projected by LEDs 2a, 2b, 2c, such that it is emitted from the face 71 of the wedge. The side faces 72, 73 of the light-guide can be polished. In order that the lenslet array images the correct color onto each pixel of the liquid crystal panel, the lenslet array has a variable pitch and focal length from one end to the other. At the end of the lenslet array next to the LEDs, the pitch will typically be coarser and the focal length shorter than at the other end which is reached via a longer optical path length.

The wedge-shaped light-guide shown in FIG. 7 has an extended region 74 through which the light passes before reaching the wedge-shaped region. That extended region allows the light emitted from the LEDs to fan out across the width of the display before they are emitted from the light-guide. The length of the region may be selected such that the focusing element correctly focuses the light onto the liquid crystal panel. A similar effect could be achieved by utilizing a diffusing material, but such a material also causes diffusion of the light such that the correct colors are not focused onto the corresponding color of pixel.

Figure 8:
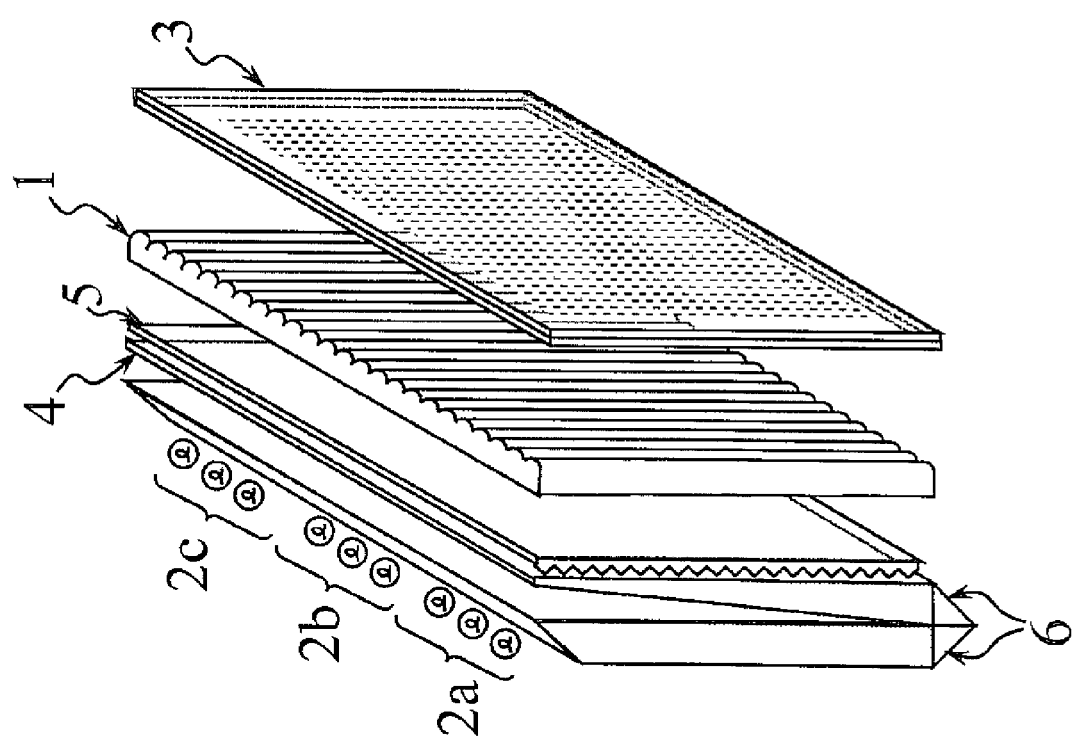
FIG. 8 shows how the set-up of FIG. 7 can be made more compact by folding the first part of the light-guide behind the second.
Figure 9:
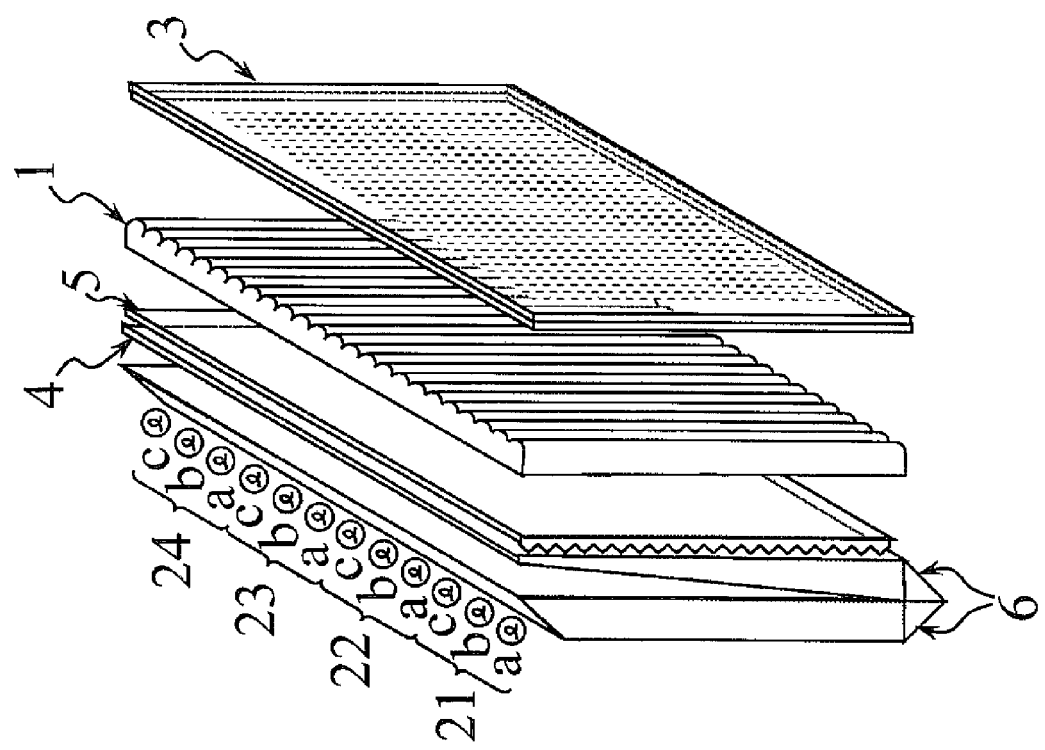
FIG. 9 shows the LED configuration of FIG. 3 applied to the folded light-guide of FIG. 8.

A prismatic sheet 5 may be positioned between light-guide 4 and lenslet array 1 so that light enters the lenslet-array perpendicular to the plane of the lenslet array. FIG. 8 shows a further example of a display using a wedge-shaped light-guide in which the light-guide is folded by the use of prisms 6 to reduce its size. FIG. 9 shows the LED configuration of FIG. 3 applied to the folded-wedge configuration.

In alternative examples, the lenslet array described above may be replaced by a hologram which performs the same function as the lenslet array, but utilizes diffraction rather than retraction. An embossed hologram is less expensive than a volumetric hologram but an embossed hologram will diffract light of different wavelengths through different angles. This can be corrected by placing a grating which diffracts light in elevation in front of the hologram. The pitch of the grating should be chosen so that the hologram then diffracts red, green and blue light through approximately the same set of angles, and means for diffusion in the vertical should be provided beyond the hologram.

Liquid crystal panels are normally illuminated by backlights whose intensity is uniform at all points, but this is wasteful if significant portions of the image being displayed are dark. In the examples described above, power consumption could be reduced by reducing the intensity of LEDs where the displayed image is intended to be dark. To further improve the power consumption saving using this technique, the number of groups of LEDs may be increased such that the area illuminated by each group is reduced. Regions of the backlight can thus be dimmed when smaller areas of the display are dark, thereby increasing the opportunity to save power using this technique. The groups of LEDs can also be arranged in a 2D array to provide further versatility. A 2D array of LEDs may be utilized with a lenslet array having columns of lenslets or with a 2D lenslet array. Furthermore, the lenslet arrays may be replaced by a hologram and a grating.

The light sources described herein could be provided utilizing one or more image projectors. Such a system allows the illumination level to be controlled across the panel in an arbitrary manner, thereby allowing full use of the power reduction technique described immediately above. A projector can be utilized in conjunction with either a lenslet array for the focusing element or a hologram and grating.

One can then project a very low resolution image such as to replace the action of the array of LEDs in the recently developed backlights. A video projector comprised of a laser and scanner, or a laser and liquid crystal hologram may be utilised. Both devices operate well at low resolution, the laser scanner because fly-back times of the scanner can be longer, and the liquid crystal hologram because the computational power needed to calculate the hologram is much lower than for a high resolution image. Power can therefore be saved without the need for color control or a thick panel.

The use of a configurable back light may also allow the contrast of the display to be increased.

CONCLUSION

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

Examples have been described with reference to the use of LEDs as a light source. As will be appreciated by the skilled person, other forms of generating light are also applicable and may be used in place of the LEDs of the described examples.

Throughout, the ordering of LED colors is for example only and any order may be utilized.

The invention claimed is:

1. A display apparatus, comprising:
a backlight emitting a plurality of discrete colors of light;
a liquid crystal panel comprising a plurality of pixels, each pixel having a plurality of regions, each region corresponding to one of the colors emitted by the backlight;
a focusing element that is a lenslet array having a plurality of lenslets configured to focus light of a particular color emitted by the backlight onto a particular pixel corresponding to the particular color;
a tapered light-guide to guide light from the backlight to the focusing element, the tapered light-guide positioned to eject light from a face of the tapered light-guide to the focusing element; and
a pitch of the lenslet array is coarser at an end that first receives the light from the tapered light-guide.

2. A display apparatus according to claim 1, wherein the colors are red, green and blue.

3. A display apparatus according to claim 1, wherein the lenslets of the lenslet array are columns to focus the light in a plane perpendicular to the columns.

4. A display apparatus according to claim 3, wherein the plurality of pixels are arranged in pixel columns such that one pixel column corresponds to one of the lenslets.

5. A display apparatus according to claim 1, wherein the backlight comprises a plurality of groups of light-sources, each group emitting at least one of the colors.

6. A display apparatus according to claim 1, further comprising one or more mirrors arranged in a plane perpendicular to the liquid crystal panel between the backlight and the focusing element.

7. A display apparatus according to claim 1, wherein the lenslets of the lenslet array focus light on at least two pixels.

8. A display apparatus according to claim 1, further comprising the backlight being arranged to inject light into a thick-end of the tapered light-guide.

9. A display apparatus according to claim 1, further comprising a prismatic sheet between the face of ejection of the tapered light-guide and the focusing element such that light enters the focusing element perpendicular to a plane of the focusing element.

10. A display apparatus according to claim 1, wherein the tapered light-guide comprises a tapered region and an extension region, wherein the extension region extends from a thick end of the tapered region.

11. A display apparatus according to claim 10, wherein the tapered light-guide is a folded light-guide and comprises a prismatic region to guide light around the folded light-guide.

12. A display apparatus according to claim 1, wherein a focal length of the lenslets of the lenslet array is shorter at the end that first receives the light from the tapered light-guide.

13. A display apparatus according to claim 1, wherein:
the backlight comprises a plurality of groups of light-sources; and
the backlight is configured to selectively reduce an intensity of one or more groups of the plurality of groups of light-sources in regions where an image is intended to be dark.

14. A display apparatus, comprising:
a backlight emitting red, green and blue light;
a liquid crystal panel comprising a plurality of pixels, each pixel comprising red, green and blue regions;
a lenslet array having a plurality of lenslets configured to focus a particular color of the red, green or blue light onto at least one particular pixel; and
one or more mirrors arranged in a plane perpendicular to the liquid crystal panel between the backlight and the lenslet array.

15. A display apparatus, comprising:
a backlight comprising red, green and blue light-sources;
a liquid crystal display comprising a plurality of pixels arranged in columns, each pixel comprising red, green and blue regions;
a lenslet array comprising a plurality of lenslet columns, wherein the lenslet array focuses light from the red, green and blue light-sources onto columns of regions corresponding to the color of the light-source; and
one or more mirrors arranged in a plane perpendicular to the liquid crystal panel between the backlight and the lenslet array.

* * * * *